Patented Oct. 10, 1944

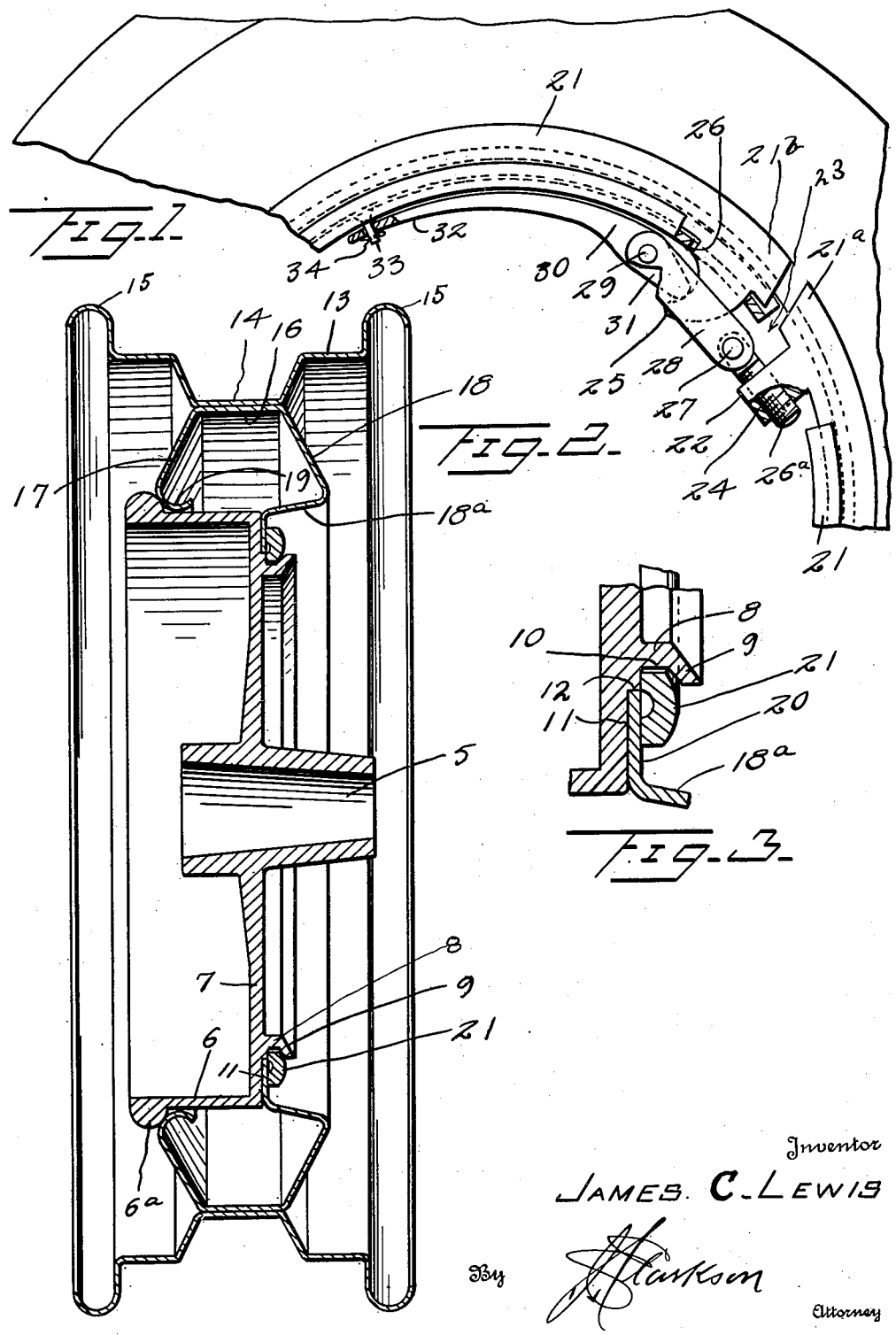

2,360,002

UNITED STATES PATENT OFFICE 2,360,002

BRAKE DRUM

James C. Lewis, Beverly Farms, Mass., assignor of one-half to Leward M. Lister, Beverly Farms, Mass.

Application February 19, 1943, Serial No. 476,444

3 Claims. (Cl. 301—6)

This invention relates to certain new and useful improvements in brake drums.

The primary object of the invention is to provide a brake drum so constructed that it will support a demountable wheel thereon.

A second object of the invention relates to brake drums provided with an annular groove to mount and detach wheels of the type adapted for use on motor vehicles and airplanes.

A third object of the invention is to provide a brake drum with an annular groove preferably formed and constructed to receive a demountable wheel, the latter encircling the brake drum and contacting therewith in a manner to permit of its being easily and quickly applied thereto, or removed therefrom, said brake drum and said demountable wheel each being provided with similarly formed shouldered portions extending therearound and adapted to abut closely together, and said brake drum being provided with an annular groove formed therein in which a split locking ring is mounted, the latter being provided for the purpose of clamping the demountable wheel upon the brake drum with the shouldered portions of each engaging each other.

In demountable wheel structure in the prior art, it has heretofore been the general practice to provide a center bearing at the nave of a wheel for mounting on an axle or hub, with such wheel structure retained in position by a plurality of circularly arranged tie bolts, and an important object of the present invention is to simplify such wheel structures by eliminating the center nave portion of the wheel and directly mounting a shortened web or spoke structure of the wheel onto the usual axle-carried brake drum, the retention thereof in position on the brake drum being accomplished by a lever actuated contracting split ring associated with the demountable wheel structure and the brake drum.

The construction hereinbefore described is such as to provide a very strong and practical form of brake drum with an annular groove together with a demountable wheel therefor and said demountable wheel may be easily and quickly attached to or removed from the brake drum of the vehicle and when in position thereon is very securely locked thereto.

With the above and other objects in view that will become apparent as the nature of the invention is better understood, the same consists in the novel form, combination and arrangement of parts hereinafter more fully described, shown in the accompanying drawing, and claimed.

In the accompanying drawing:

Figure 1 is a fragmentary side elevational view, partly in section, of a demountable wheel structure constructed in accordance with the present invention and illustrating a lever actuated contracting ring associated with a brake drum for retaining the wheel in position on the brake drum, Figure 2 is a cross-sectional view of a demountable wheel structure constructed in accordance with the present invention, showing the wheel structure supported on the brake drum, and Figure 3 is an enlarged detail sectional view showing the ring supporting flange on the brake drum for retaining the wheel thereon.

Referring more in detail to the accompanying drawing, and particularly to Figure 2, the reference character 5 designates the hub portion of a wheel structure that receives the stub axle of a vehicle and formed integral with this hub portion 5 is a brake drum comprising an annular band section 6 with the usual closed side wall 7 carrying the hub 5. It is, of course, to be understood that the brake drum may be constructed as an independent element and suitably secured to the hub 5.

An annular flange 8 is carried by the wall 7 of the brake drum adjacent the peripheral band section 6 and projects outwardly thereof at right angles, the flange 8 at its outer edge carrying an outwardly flaring angular extension 9 forming an annular channel 10 at the outer side of the flange 8 in cooperation with the adjacent outer face of the wall 7 of the brake drum. Also, for purposes presently to appear, the outer face of the wall 7 outwardly of the flange 8 is mitered to provide a recess 11 and an abutment shoulder 12. As shown in Figure 2, the band portion 6 of the brake drum carries an outwardly directed annular bead 6ᵃ at the open side of the brake drum.

The demountable wheel may be of the clincher or straight-side type and comprises a rim portion 13 centrally countersunk as at 14 and outwardly directed arcuate edge bead portions 15. While the demountable wheel inwardly of the rim 13 may be of the spoke or web type, the same for purposes of illustration is shown as being of web character in which the inner face of the countersunk portion 14 is engaged by the outer wall of a channel web comprising an outer wall portion 16 carrying inwardly directed flaring side wall sections 17 and 18 of relatively short dimensions. As shown in Figure 2, the inner edge of the side wall section 17 of the wheel web is arcuately curved inwardly as at 19 in simulation of a bead for contact with the bead 6ª on the brake drum. The outwardly flaring side wall section 18 of the wheel web, when the wheel is in its seated position on the brake drum, extends outwardly of the flanged portion 8 of the brake drum and carries an inwardly inclined wall extension 18ª that terminates in a flat annular band portion 20 for seating reception in the recess 11 in the wall 7 of the brake drum, with the inner edge of the annular band 20 engaging the abutment shoulder 12 as clearly shown in Figure 3.

To retain the demountable wheel in position on the brake drum, there is provided a split ring 21, one split end 21ª of which carries an inwardly directed lug 22 that passes through an opening 23 in the annular flange 8 as shown in Figure 1, this lug being provided with a threaded bore 24. The other end 21ᵇ of the split ring 21 carries a hook-shaped lug 25 that projects through an opening 26 in the annular flange 8. The split ring 21 is of the shape in cross-section as shown in Figure 3, the inner side thereof seating in the annular recess 10, with an adjacent portion of its side face engaging with an adjacent portion of the outer face of the brake drum wall 7, while the outer portion of the split ring 21 overlaps and engages the annular band 20 carried by the side wall section 18 of the wheel web.

The devices for contracting the split ring 21 to lock the same in position within the annular groove 10 of the flange 8 for retaining the demountable wheel in position on the brake drum include a stud screw 26ª threaded in the bore 24 of the lug 22 at one end of the ring as shown in Figure 1, the end of the stud screw 26 projecting toward the ring end 21ᵇ carrying a pair of diametrically opposite pins 27 for the pivotal support of a pair of links 28, the other ends of which links are pivoted to pin ends 29 laterally projecting from a lever 30. The nose 31 of the lever 30 is engageable with the hook-shaped lug 25 carried by the split end 21ᵇ of the ring 21, while the other end 32 of the lever has an opening therein for the passage of a pin 33 projecting inwardly of the annular flange 8 with the end of the pin projecting through the lever end 32 receiving a retaining cotter 34.

From the above detailed description of the invention, it is believed that the construction and use thereof will at once be apparent, it being noted that with the demountable wheel in position on the brake drum as shown in Figure 1, the same is retained in such position by the split ring 21, the ring holding the band 20 of the web wheel 18 tightly seated in the recess 11 of the brake drum wall 7 and with the bead-like portion 19 upon the other wall web 17 engaged with the brake drum bead 6ª. To demount the wheel, the lever 30 is disengaged from the retaining pin 33 and by pivotal movement thereof, the nose end 31 of the lever is disengaged from the hook lug 25, whereupon the split ring may be further manually expanded for removal from the annular recess 10 in the flange 8 for the final removal of the wheel from the brake drum. With a structure of this character the demountable wheel is securely retained in position on the brake drum and the use of the usual multiplicity of nut and bolt combinations for retaining a demountable wheel in position is eliminated. With the provision of the threaded stud 26 proper tightening of the split ring and movement of the locking lever 30 may be accomplished. It is also to be understood that the invention disclosed herein may be used in wheel structures in various arts to include the landing gear wheels for aircraft.

While there is herein shown and described the preferred embodiment of the invention, it is nevertheless to be understood that minor changes may be made therein without departing from the spirit and scope of the invention as claimed.

What is claimed as new is:

1. In a demountable wheel of the character described, a hub and brake drum, an outwardly directed bead on the drum at the open side thereof, an annular flange projecting outwardly of the closed side of the drum adjacent the periphery thereof and being annularly grooved, the outer face of the closed wall of the brake drum having an annular recess therein outwardly of said flange, the wheel comprising a web portion with one side engaged with the drum bead and the other side received in the recess in the closed side wall of the brake drum and a collapsible ring element seated in the groove engageable with one side of the wheel and adjacent side of the brake drum for holding the wheel on the brake drum.

2. The combination with a wheel rim having an outer annular tire carrying portion and an inner annular portion of substantially trough shaped cross-section, one side of said inner portion having its edge curved toward the other side to form a rim bead, the other side of said inner portion having an edge portion extending toward the first side and provided with an annular flange extending inwardly of the rim, of a brake drum having a radially disposed web provided with a peripheral flange having an outwardly extending bead at its free edge engaged by the rim bead, said annular flange engaging against said web, an outwardly open grooved flange on the web side engaged by the annular flange of the rim, and a collapsible retaining ring held in said grooved flange and engaging flatly against the outer face of said annular rim flange.

3. The combination with a wheel rim having an outer annular tire carrying portion and an inner annular portion of substantially trough shaped cross-section, one side of said inner portion having its edge curved toward the other side to form a rim bead, the other side of said inner portion having an edge portion extending toward the first side and provided with an annular flange extending inwardly of the rim, of a brake drum having a radially disposed web provided with a peripheral flange having an outwardly extending bead at its free edge engaged by the rim bead, said annular flange on the web side engaged by the annular flange of the rim, an annular grooved flange on the outer face of said web and a collapsible retaining ring held in said grooved flange and engaging the outer face of said annular rim flange, said grooved flange having the outer face of the groove tapered toward the web to force the ring flatly against said annular flange as said ring contracts.

JAMES C. LEWIS.